(12) United States Patent
Haugland et al.

(10) Patent No.: US 11,802,463 B2
(45) Date of Patent: Oct. 31, 2023

(54) WIRELINE CLEAN-OUT TOOL HAVING IMPROVED CAPACITY

(71) Applicant: Altus Intervention (Technologies) AS, Stavanger (NO)

(72) Inventors: Lasse Haugland, Bryne (NO); Svein Edvardsen, Borkenes (NO)

(73) Assignee: Altus Intervention (Technologies) AS, Stavanger (NO)

( * ) Notice: Subject to any disclaimer, the term of this patent is extended or adjusted under 35 U.S.C. 154(b) by 107 days.

(21) Appl. No.: 17/607,238

(22) PCT Filed: Jun. 24, 2020

(86) PCT No.: PCT/NO2020/050176
§ 371 (c)(1),
(2) Date: Oct. 28, 2021

(87) PCT Pub. No.: WO2020/263103
PCT Pub. Date: Dec. 30, 2020

(65) Prior Publication Data
US 2022/0220827 A1    Jul. 14, 2022

(30) Foreign Application Priority Data
Jun. 27, 2019   (NO) .................................... 20190809

(51) Int. Cl.
*E21B 37/00* (2006.01)
*B01D 29/64* (2006.01)
(Continued)

(52) U.S. Cl.
CPC .......... *E21B 37/00* (2013.01); *B01D 29/6407* (2013.01); *B08B 9/045* (2013.01);
(Continued)

(58) Field of Classification Search
CPC . E21B 37/00; E21B 27/04; E21B 4/02; E21B 37/02; E21B 37/04; E21B 37/045; E21B 37/081; E21B 21/002; E21B 21/08
See application file for complete search history.

(56) References Cited

U.S. PATENT DOCUMENTS

| 5,033,545 A | * | 7/1991 | Sudol ................. E21B 41/0078 134/167 C |
| 6,250,387 B1 | | 6/2001 | Carmichael et al. |

(Continued)

FOREIGN PATENT DOCUMENTS

| EP | 3156584 A1 | 4/2017 |
| EP | 2655789 B1 | 9/2019 |

(Continued)

*Primary Examiner* — David Carroll
(74) *Attorney, Agent, or Firm* — GableGotwals

(57) ABSTRACT

A wireline clean-out tool including a first opening and a second opening at or near a free-end portion. The first opening takes in debris from a wellbore, the second opening ejects fluid into the wellbore. A housing defines a first flow path from the first opening at the free-end portion to an opposite end portion of the housing and a second flow path from the opposite end portion to the second opening at the free-end portion. The flow paths couple with each other at the opposite end portion. A collection chamber is in the first flow path for collecting debris during operation. A progressive cavity pump with hollow rotors is placed inside the housing at a predefined distance from the free-end portion being configured for operating on the first flow path while the hollow rotor forms part of the second flow path.

17 Claims, 7 Drawing Sheets

(51) Int. Cl.
  *B08B 9/045* (2006.01)
  *E21B 27/00* (2006.01)
  *E21B 27/04* (2006.01)
  *E21B 23/00* (2006.01)
  *E21B 4/02* (2006.01)
  *E21B 47/00* (2012.01)

(52) U.S. Cl.
  CPC ............ *E21B 27/005* (2013.01); *E21B 27/04* (2013.01); *B08B 2209/04* (2013.01); *E21B 4/02* (2013.01); *E21B 23/001* (2020.05); *E21B 47/00* (2013.01)

(56) References Cited

U.S. PATENT DOCUMENTS

| | | | |
|---|---|---|---|
| 9,850,728 | B2 | 12/2017 | Wessel |
| 2004/0099413 | A1* | 5/2004 | Arceneaux ............ E21B 37/02 166/173 |
| 2009/0078422 | A1* | 3/2009 | Manson ............ E21B 37/00 166/105.1 |
| 2014/0053874 | A1* | 2/2014 | Mackenzie ............ E21B 37/00 134/22.12 |
| 2014/0326510 | A1* | 11/2014 | Wessel ............ E21B 4/04 175/57 |
| 2015/0226046 | A1* | 8/2015 | Wolf ............ F04C 13/00 166/372 |
| 2015/0337610 | A1* | 11/2015 | Strachan ............ E21B 17/18 175/57 |
| 2017/0009545 | A1* | 1/2017 | Haugland ............ E21B 27/04 |
| 2018/0073317 | A1* | 3/2018 | Haugland ............ E21B 37/02 |
| 2018/0238143 | A1* | 8/2018 | Falk ............ E21B 37/00 |

FOREIGN PATENT DOCUMENTS

| | | |
|---|---|---|
| NO | 20171943 A1 | 7/2019 |
| WO | WO 03003602 A1 | 1/2003 |
| WO | WO 2012085556 A2 | 6/2012 |
| WO | WO 2013184100 A1 | 12/2013 |
| WO | WO 2014025835 A2 | 2/2014 |
| WO | WO 2015142184 A1 | 9/2015 |
| WO | WO 2016150862 A1 | 9/2016 |
| WO | WO 2018057960 A1 | 3/2018 |
| WO | 2019112441 A1 | 6/2019 |

* cited by examiner

WIRELINE CLEAN-OUT TOOL HAVING IMPROVED CAPACITY

CROSS-REFERENCE TO RELATED APPLICATIONS

This United States application is the National Phase of PCT Application No. PCT/NO2020/050176 filed 24 Jun. 2020, which claims priority to Norwegian Patent Application No. 20190809 filed 27 Jun. 2019, each of which is incorporated herein by reference.

FIELD OF THE INVENTION

The invention relates to a wireline clean-out tool for collecting debris in a wellbore. The invention further relates to a downhole tool string assembly comprising a wireline and such wireline clean-out tool according to the invention, optionally with a wireline tractor.

BACKGROUND OF THE INVENTION

Wireline-based downhole clean-out tools (debris-collecting tools) of the kind of the invention are generally used in a casing or tubing in a well. Such tools typically comprise an electric engine-based collection system. An example of such tool typically comprises transport blades on a rotatable shaft, which extends through, or partly through a collection chamber, a filter section for particle separation, a front part with an input screw and valve. Such downhole tool is known from patent publication WO03/036020A1.

Pollution in a petroleum well typically consists of different materials and often matter with a binding effect. Such material typically collects in the collection chamber and does not fall out even if the debris-collecting tool is pulled out of the well. The collected material must in such cases be scraped out or washed out from the collection chamber. In other cases the polluted material does not comprise any binding material, for example when it concerns silt and sand. These materials are collected in a similar manner in the collection chamber, but have a volatile character and will leak out of the system when the debris-collecting tool is pulled up from a horizontal to a vertical well section. Wherever the word "debris" is used in this description it is intended to include debris, sand, silt, salt, mud particle and other volatile components that may be collected from a petroleum well.

In order to keep the volatile consistence materials inside the collection chamber a valve may be needed in the lower part of the debris-collecting tool. It is very challenging to collect large amounts of debris with electromechanical equipment. Such equipment generally has limited torque, because of the fact these tools are supplied via a cable from the surface. Expressed differently, the amount of electrical power that can be fed through the cable is limited and thereby the amount of available torque is limited. Thus, the amount of material that can be collected in one go depends on the force that may be supplied and on how optimal the tool has been designed. The amount of force that is available is therefore desired to be used to the best extent possible, such that larger amounts of material can be taken out of the well in one run. Since it is often not known upfront which consistence the pollution has, and if the pollution shifts in consistence further down the well, it may be normal to use a valve as a rule.

A traditional way of cleaning wellbores concerns coiled tubing technology. Coiled tubing technology allows effective cleaning of wellbores. The major advantages of coiled-tubing-based cleaning are its flexibility and cleaning speed. As soon as the cleaning operation is started it is carried out both fast and effectively even when the downhole circumstances like well deviation and debris consistency vary a lot from well to well and over time. A major disadvantage of coiled tubing technology is the size of the equipment that is needed. This equipment is very large, heavy and very space demanding. This influences both its transport on and offshore as well as at the well. Particularly when carried out on an oilrig this forms a major challenge. All other activities on the rig generally need to be adapted and it takes a lot of time to set up the equipment before it can be used. This is the reason why coiled tubing technology is mobilized in "onboard" campaigns. When there are enough candidate wellbores with reduced production due to clogging with debris, the coiled tubing campaign is launched. Once these campaigns have been started it becomes very difficult for wireline technologies to compete with coiled tubing technology.

However, in case there are only a few wellbores having reduced production a coiled tubing operation would take way too much time (and therefore money) for it to be commercially attractive. Waiting for more wellbores to be ready for clean-out after setting up the coiled tubing equipment would involve enormous losses as well.

In these situations wireline-based solutions thus have a large chance of becoming more attractive, particularly when they are further improved.

Document WO2016/150862A1 discloses a downhole tool string comprising a motor unit having a rotational shaft rotating with a rotational motor speed; a gear section; an operational tool having a tool shaft rotated by the gear section at a lower rotational speed than that of the rotational shaft; and a pump unit having a rotor shaft rotated by the motor unit for providing fluid around or past an operational tool. The pump unit is arranged between the gear section and the operational tool. Even though this downhole tool string provides a clever solution for rotating the operational tool at a lower rotational speed than the pump it still involves a very complex solution, wherein particularly the gear section is space demanding and thus "eats" from the debris-collecting capacity of the downhole tool.

Document EP3,156,584B1 discloses a debris removal apparatus, which includes a housing. The housing has a chamber located therein. The chamber has at least one closed end. The debris removal apparatus can also include a first flow path. The first flow path can be in communication with an opening in the first end of the housing. The first flow path can also have an exit, and a diverter can be located adjacent to the exit. A port can be located between the diverter and the exit of the first flow path. The port can be in fluid communication with the first flow path and the chamber. The chamber can be in communication with a second flow path, and a screen operatively positioned between the chamber and second flow path. Even though this debris removal apparatus is capable of collecting different types of debris, it still suffers from rapid clogging of the filter and is also difficult to empty once filled.

Despite these improvements there is still a need to further improve the wireline clean-out tools, in particular in view of their capacity. Furthermore there is a need to solve the problem of clogging and emptying of the clean-out tool.

SUMMARY OF THE INVENTION

The invention has for its object to remedy or to reduce at least one of the drawbacks of the prior art, or at least provide a useful alternative to the prior art.

The object is achieved through features, which are specified in the description below and in the claims that follow.

The invention is defined by the independent patent claims. The dependent claims define advantageous embodiments of the invention.

In a first aspect the invention relates more particularly to a wireline clean-out tool for collecting debris in a wellbore. The wireline clean-out tool comprises:

a first opening and a second opening being provided at or near a free-end portion of the wireline clean-out tool, wherein the first opening is for taking in said debris from the wellbore, and the second opening is for ejecting fluid into the wellbore;

a housing defining a first flow path running from the first opening at the free-end portion to an opposite end portion of the housing, and a second flow path running from the opposite end portion to the second opening at the free-end portion, wherein said flow paths are coupled with each other at the opposite end portion;

a collection chamber provided in the first flow path for collecting said debris during operational use of the wireline clean-out tool, and a progressive cavity pump having a hollow rotor, wherein the progressive cavity pump is placed inside the housing at a predefined distance from the free-end portion being configured for operating on the first flow path while the hollow rotor forms part of the second flow path.

The effects of the combination of the features of the invention are as follows. The wireline clean-out tool in accordance with the invention excels in simplicity and effectivity. First of all, the tool is provided at its free-end both with a first opening for collecting debris as well as a second opening for ejecting fluid, the first opening is in fluid communication with a first flow path, which extends to an opposite end portion, where it is coupled to a second flow path, which extends back to the free-end portion. The collection chamber is placed in the first flow path. A very interesting and very effective feature of the clean-out tool is the provision of a progressive cavity pump having a hollow rotor and operating (with its rotor and stator) on the first flow path. The inventor realized that the rotor, which typically is an eccentric screw, may have the additional function of defining a further flow path, here the second flow path back to the free-end portion. The consequence of this feature is significant in that the capacity of the pump may be considerably increased for the same diameter of the pump, i.e. the stator rotor are dimensioned for a specific pump capacity operating on the first flow path and the hollow rotor passively defines the return path, i.e. second flow path back to the free-end portion. Expressed differently, the progressive cavity pump may be designed to fill the complete cross-sectional area of the clean-out tool, maximizing its capacity to act on the first flow path, without the need to design a further flow path to allow fluid to pass the pump and flow back to the free-end portion. The simplicity of this design opens up a new world of possibility to further improve the clean-out tool as will be explained with reference to the dependent claims. The core of the wireline clean-out tool in accordance with claim 1 is that debris is taken in through the first opening at the free-end portion of the tool, pumped through the first flow path and the progressive cavity pump to the opposite end-portion and then back through the second flow path to the second opening at the free-end portion. Thus, effectively the core of the invention is a clean-out tool with a very effective suction and ejection, which may be used in a variety of ways. When combined with rotating debris loosening techniques in a well-cleaning device at the free-end portion of the tool, the large effectivity of the suction and ejection opens up the possibility to design the tool completely gearless, i.e. the rotation speed of the pump may be the same as the rotation speed of the well-cleaning device. Such gearless solutions have not been reported before. It is quite common to make the pump rotate at different speeds than the well-cleaning device.

In an embodiment of the wireline clean-out tool in accordance with the invention the first flow path is annular and the second flow path is inside the first flow path. This is a concentric configuration of said flow paths and provides for the most practical and effective configuration of the clean-out tool, particularly in view of further embodiments as will be explained hereinafter.

In an embodiment of the wireline clean-out tool in accordance with the invention the wireline clean-out tool comprises a further progressive cavity pump having a further hollow rotor, wherein the further progressive cavity pump is placed inside the housing at a further predefined distance from the free-end portion closer to the opposite end portion such that it operates on the first flow path while the further hollow rotor forms part of the second flow path. The advantage of providing a second progressive cavity pump is manifold. First of all, it allows for different pump strengths such that the suction and ejection volume can be individually controlled. Second, it allows for individually varying said suction and ejection volume depending on the circumstances and requirements.

In an embodiment of the wireline clean-out tool in accordance with the invention the housing comprises an inlet in the vicinity of the further progressive cavity pump for allowing well fluid to be sucked in from the wellbore at a further predefined distance further away from the free-end portion. Giving the further progressive cavity pump an inlet allows for better individual control of the pump forces. In addition the further progressive cavity pump conveniently takes in fluid at distance from the free-end portion without disturbing the input and output flows at the first and second opening too much.

In an embodiment of the wireline clean-out tool in accordance with the invention the inlet is formed by a porous wall, such as a filter wall, of the housing. The advantage of this embodiment is that by providing the housing locally with a porous wall it may perform the function of filter both for inflowing well liquid. Thus the further progressive cavity pump sucks in liquid through the porous wall. In further embodiments the porous wall may be enlarged so as to form a filter for the collection chamber as well, i.e. the well fluid that is taken in at the opening is transported through the first flow path into the collection chamber, where the well fluid is pressed out through the porous wall while the debris is kept in by the porous wall.

An embodiment of the wireline clean-out tool in accordance with the invention further comprises a well-cleaning device provided at a free-end portion of the wireline clean-out tool and being configured for loosening said debris in the wellbore. The effectivity of the clean-out tool is significantly increased by providing a well-cleaning device at the free-end portion, which assists in loosening the debris before it is sucked into the clean-out tool through the opening at the free-end portion.

In an embodiment of the wireline clean-out tool in accordance with the invention the well-cleaning device comprises a rotatable member, such as a drill bit, honing head or a brush, wherein the wireline clean-out tool further comprises a rotatable shaft extending fully through the housing for actuating the rotatable member, wherein the rotatable shaft is hollow and defines the second flow path, and wherein the annular space between the rotatable shaft and the housing defines the first flow path. Drilling, honing and brush form a first group of debris-loosening techniques. All three techniques require a rotatable shaft to drive the rotatable member (drill or brush). In the invention this rotatable shaft may be advantageously made hollow such that it may be used as the second flow path towards the second opening at the free-end portion.

In an embodiment of the wireline clean-out tool in accordance with the invention the well-cleaning device further comprises a jetting device coupled to the second flow path for loosening debris in the wellbore by jetting. Jetting forms a second debris-loosening technique. The second opening may be conveniently used as jetting exhaust.

In an embodiment of the wireline clean-out tool in accordance with the invention the jetting device comprises a plurality of exhaust openings (i.e. jetting nozzles) distributed around a circumference of the jetting device such that the jetting may be done in a plurality of radial directions simultaneously, and optionally also in more axial directions. Providing a plurality of openings around the circumference of the jetting device significantly improves the debris-loosening effectivity.

In an embodiment of the wireline clean-out tool in accordance with the invention the rotatable shaft comprises one or more transport blades at least over part of its length for transporting the debris from the free-end portion to the collection chamber through rotation of the rotatable shaft. Transport blades may also be used to distribute the debris in the collecting chambers. The use of transport blades in a debris collection tool is known as such. In the current invention it adds to the effectivity of the wireline clean-out tool. The feature is very easily added, when there is a rotatable shaft present in the tool.

In an embodiment of the wireline clean-out tool in accordance with the invention the collection chamber comprises at least one filter for catching debris from the well fluid that is being transported through the first flow path. It is the filter which then defines the boundary (and thus capacity) of the collection chamber. The filter may be placed inside the collection chamber and/or right before said progressive cavity pump.

Embodiments having both the rotatable shaft and the filter may advantageously be provided with a brush on the transport blades, which touches the filter surface to effectively remove material from the filter surface to avoid filter cake formation, which may form an obstruction (not shown in the drawings). Brush-filter combinations like these have been reported before and may conveniently be combined with the current invention for further improvement of the wireline clean-out tool.

In an embodiment of the wireline clean-out tool in accordance with the invention the wireline clean-out tool is equipped with sensors and measurement devices to support the downhole cleaning operation.

In a second aspect the invention relates to a downhole tool string assembly comprising a wireline and a wireline clean-out tool according to the invention. It is clear that the invention may be advantageously applied in wireline clean-out tools.

An embodiment of the downhole tool string assembly in accordance with the invention further comprises a wireline tractor coupled between the wireline and the wireline clean-out tool. In case of deviating or even horizontal wellbores, a wireline tractor is conveniently provided in between the wireline and the wireline clean-out tool. Wireline tractors are known in the petroleum industry and carry out tasks in both vertical wellbores and strongly deviating wellbores. The main task of a wireline tractor is to transport equipment and tools to specific locations downhole. In addition the wireline tractor plays an important role in anchoring and counter-rotation, wherein the purpose is to make drill bits rotate and not the tool string itself. Today's wireline tractor is constructed purpose-driven and can transport equipment quickly to the desired location. When the location has been reached power and speed of the tractor may be adapted such that clean-out of the wellbore may be done as effectively as possible.

BRIEF INTRODUCTION OF THE DRAWINGS

In the following is described examples of preferred embodiments illustrated in the accompanying drawings, wherein.

DETAILED DESCRIPTION OF THE EMBODIMENTS

As already discussed in the introduction the invention provides for a completely new structure for wireline clean-out tools. In the figures hereinafter different embodiments will be discussed, which serves to illustrate that the amount of variations is virtually limitless. As will be explained in view of the example embodiments given, all embodiments have in common that their structure is very simple, and does not require a gear to provide for different rotation speeds between the pump and the well-cleaning device such as a rock bit, PDC bit, brush and the like.

This will be further explained in the detailed description, which follows.

Figure 1:
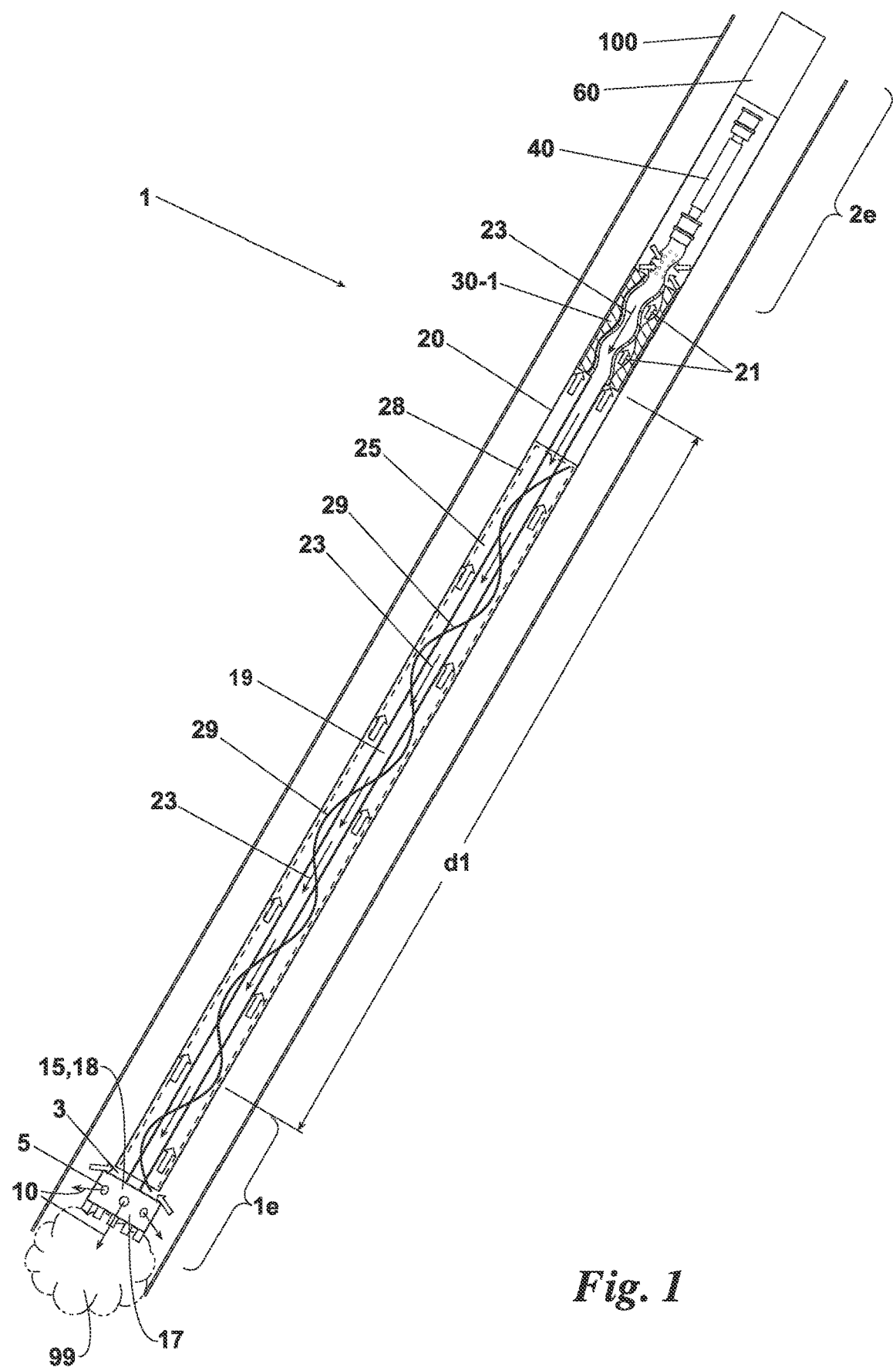
FIG. 1 shows a first embodiment of a wireline clean-out tool in accordance with the invention.

FIG. 1 shows a first embodiment of a wireline clean-out tool 1 in accordance with the invention. The wireline clean-out tool is provided in a wellbore 100, which is clogged with debris 99 as illustrated. The wellbore 100 may comprise a casing, a tubing, liner or another type of tubular structure. The tool 1 comprises a housing 20 and has a free-end portion 1e and an opposite end portion 2e at its other end as illustrated. At the opposite end portion 2e there is provided a rotation motor 60, which may be an electric rotation motor.

The rotation motor 60 drives a well-cleaning device 15 at the free-end portion 1e of the wireline clean-out tool 1. In order to make this happen the driving axle of the rotation motor 60 is mechanically coupled to a flex joint 40 as illustrated. The flex joint 40 on its turn is mechanically coupled to a progressive cavity pump 30, 30-1. The progressive cavity pump 30, 30-1 is mechanically coupled to a hollow rotatable shaft 19, which on its turn is mechanically connected to the well-cleaning device 15. The well-cleaning device 15 may comprise a rotatable member 17 selected from the group comprising: a rock bit, PDC bit, and a brush (cleaning or honing). What these devices have in common is that they are rotated in operational use to loosen the debris 99 that has clogged or partially blocked the wellbore 100. The rotatable member 17 is spaced apart from the housing 20 such that a first opening 3 is formed between them. This first opening 3 serves primarily to suck in well fluid as illustrated by the hollow arrows. The well-cleaning device 15 may further comprise a jetting device 18, which, in this embodiment, is integrated with the rotatable member 17 and comprises a plurality of holes (nozzles) 5 distributed around the circumference of the jetting device 18 as illustrated. The plurality of openings 5 are referred to in the claims as the second opening and serve to eject fluid 10 into the wellbore in order to loosen the debris 99 that has clogged or partially blocked the wellbore 100. So the jetting device 18 adds to the debris-loosening effect of the rotatable member 17.

Still it must be kept in mind that both the rotatable member 17 and the jetting device 18 are optional and add to the effectivity of the clean-out tool 1. The core of the wireline clean-out tool 1 of the invention is in fact formed by a first flow path 21 formed in the annular space between the rotatable shaft 19 and the housing 1 and extends from the first opening 3 to the progressive cavity pump 30, 30-1, which operates with its progressive cavity on the first flow path 21, i.e. it sucks in fluid from the annular space at the lower side and ejects fluid in the annular space at the upper side as illustrated. It is essential to the invention that the rotor 35 (FIG. 7) of the progressive cavity pump 30, 30-1 is hollow, for the reasons as explained hereinafter. At the opposite end portion 2e the rotor of the progressive cavity pump 30, 30-1 has been provided with holes to allow fluid to enter the hollow rotor, wherein the fluid effectively follows a second flow path 23 back to the free-end portion 1e through the hollow rotor and the hollow rotatable shaft 19 as illustrated. The space around the flex joint 40 is closed, which forces the fluid to enter the hollow rotor as illustrated by the hollow arrows in FIG. 1.

The purpose of the wireline clean-out tool 1 is to collect debris 99 and therefore it is also provided with a collection chamber 25, which in this embodiment has been provided in the first flow path 21 between the pump 30, 30-1 and the well-cleaning device 15. In order to assist in keeping the debris in the collection chamber 25 a filter 28 may be added as illustrated. In fact the filter 28 defines the boundaries of the collection chamber 25. FIG. 1 further illustrates that the progressive cavity pump 30, 30-1 is provided at a predefined distance d1 from the free-end portion 1 e. Even though the length of the free-end portion 1 e is a bit arbitrary the figure still illustrates that the predefined distance dl between the progressive cavity pump 30, 30-1 and the free-end portion 1e determines the volume (capacity) of the collection chamber 25. The clean-out tool 1 in accordance with the invention may also be provided with multiple collection chambers 25 and/or multiple filters 28 if so desired.

The above-mentioned configuration of the openings 3, 5 at the free-end portion 1e and two flow paths 21, 23 that stretch all the way to the opposite end portion 2e where they are connected, and wherein a progressive cavity pump 30, 30-1 with a hollow rotor 35 (FIG. 7) is placed in one of said flow paths 21, 23 is revolutionary because of its simplicity.

In the current embodiment of FIG. 1 the flow paths 21, 23 are fully concentric, which conveniently uses almost all inner space within the housing 20 for flow capacity. The concentric configuration of the flow paths 21, 23 is conveniently combined with the rotatory concepts of the well-cleaning device 15 that is driven by the electric motor 60, wherein the hollow shafts 19 and rotor 35 (FIG. 7) are used to embody the second flow path 23, and the annular space around the shafts 19 is used for the first flow path 21. The electric motor 60 may conveniently drive the progressive cavity pump 30, 30-1 and the well-cleaning device 15 at the same speed, thereby taking away the need for a gear. There may still be a fixed gear present between the electric motor 60 and the rotatable shafts and flex joints, but there is no need to provide for different rotation speeds for the well-cleaning device 15 and the pump 30, 30-1 and that constitutes a significant advantage over the prior art solutions.

A final feature to be discussed in view of FIG. 1 is the presence of the transport blades 29 mounted to the rotatable shaft 19. These transport blades 29 are clearly optional in all embodiments, but may help with the transportation of debris 99 from the first opening 3 to the collection chamber 25. There are many ways to design transport blade 29, but generally they form some sort of transport screw. All these variations fall within the scope of the invention. The angle and depth of the transport blades 29 may be adapted in accordance with the function it shall perform.

Thus, effectively speaking, the wireline clean-out tool 1 of FIG. 1 combines rotation, suction, fluid circulation, fluid flushing/washing, mechanical transport of impurities/debris, high-pressure jetting, separation through precipitation and filtering. As already made clear, some of these functions are optional, but they all add to the effectivity of the wireline clean-out tool 1.

The wireline clean-out tool 1 may further comprise sensors and measurement devices (not shown) to support the downhole operation as is generally known in the field of the invention.

Figure 2:
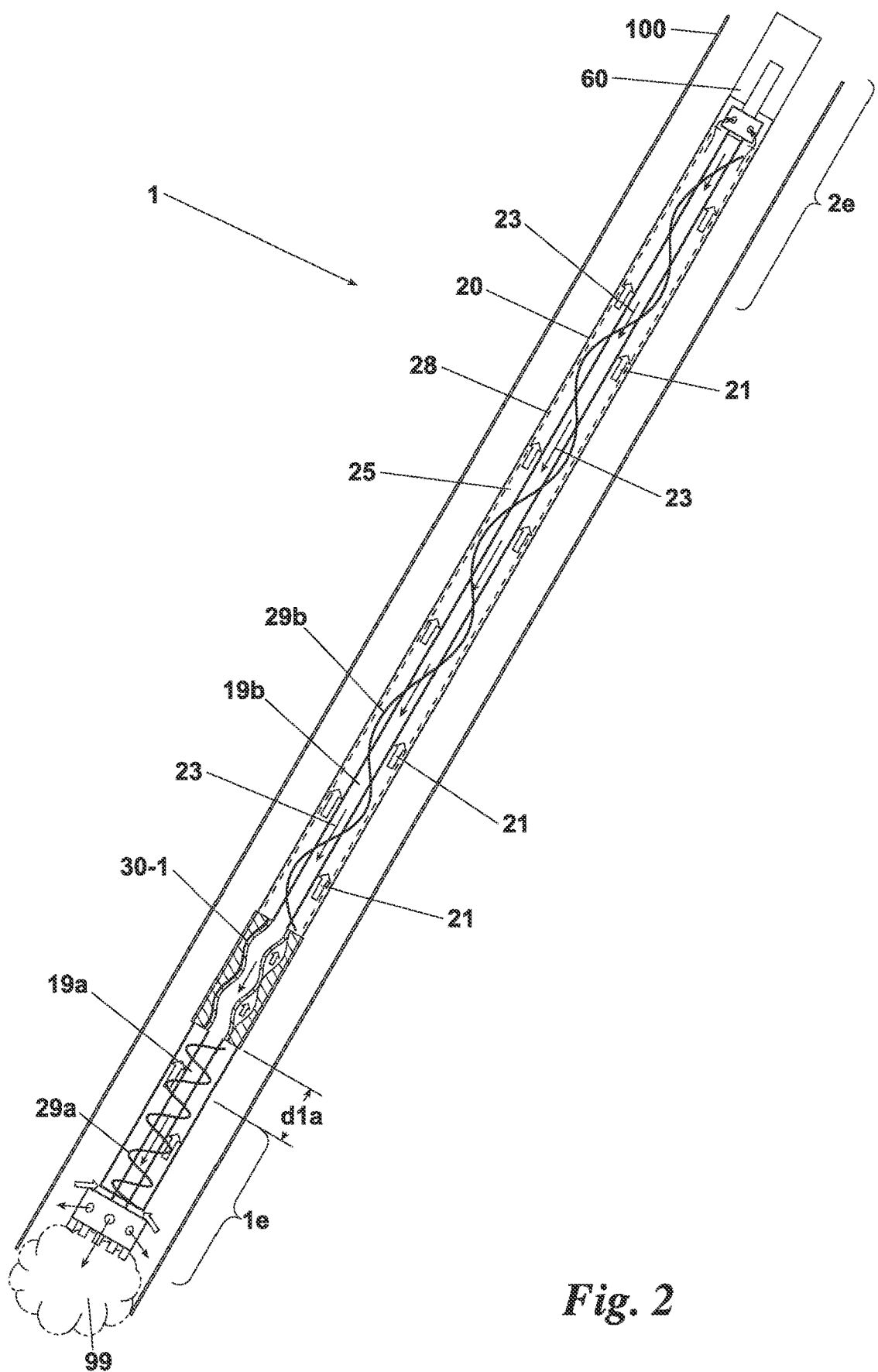
FIG. 2 shows a second embodiment of a wireline clean-out tool in accordance with the invention.
Figure 3:
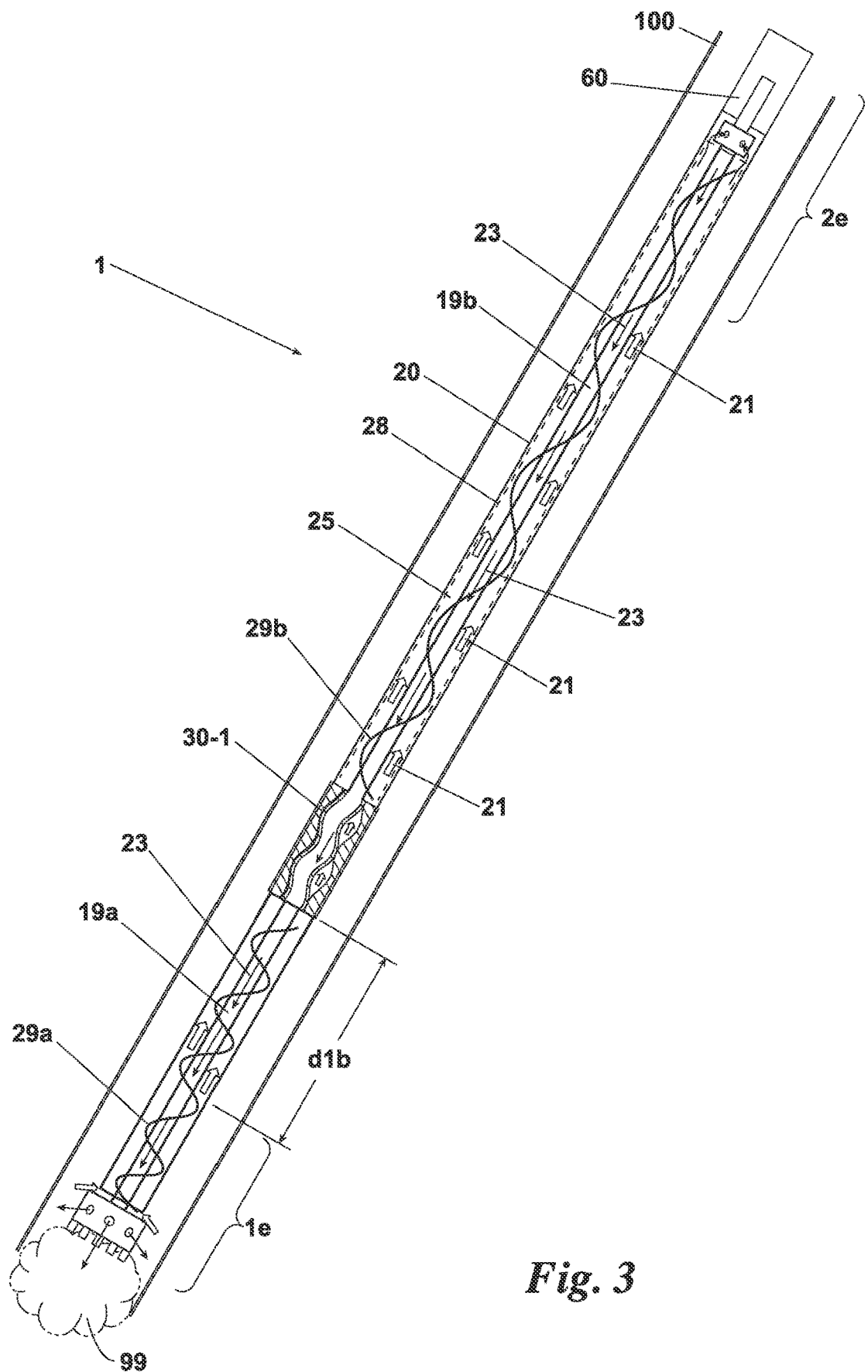
FIG. 3 shows a third embodiment of a wireline clean-out tool in accordance with the invention.

FIG. 2 shows a second embodiment of a wireline clean-out tool 1 in accordance with the invention. This embodiment will only be discussed in as far as it differs from the previous embodiment. The progressive cavity pump 30-1 in this embodiment is provided at a shorter distance d1a from the free-end portion 1e, and the collection chamber 25 with the filter 28 has been moved to the other side (downstream side) of the progressive cavity pump 30-1. The hollow rotatable shaft 29 now has two parts, i.e. a lower hollow rotatable shaft 29a connected between the well-cleaning device 15 and the progressive cavity pump 30-1, and an upper hollow rotatable shaft 29b connected between the progressive cavity pump 30-1 and the rotation motor 60. The lower rotatable shaft 29a has its own transport blades 29a and the upper rotatable shaft 29b has its own transport blades 29b. A progressive cavity pump 30-1 may have the problem that the rotor connection does not remain completely in the centre position when the rotor rotates, i.e. it moves a bit back and forth during rotation. In the embodiment of FIG. 1 this issue was resolved with the flex joint 40. However, the inventor realized that such flex joint 40 may not be required in case the rotatable shaft 29a, 29b connected to it is long enough, because then it may easily take the varying position of the rotor connection. This has been implemented in the embodiment of FIG. 2. An interesting bonus-effect of the progressive cavity pump 30-1 is that it, when in rest, also acts as a valve. Thus placing it closer to the free-end portion 1e reduces the need for a proper valve at the free-end portion 1e, a simple flap valve may be sufficient. FIG. 3 shows a third embodiment of a wireline clean-out tool 1 in accordance with the invention. This embodiment will only be discussed in as far as it differs from the previous embodiment. The progressive cavity pump 30-1 in this embodiment is placed at a different distance d1b from the free-end portion 1e, thus resulting in a collection chamber of a different size than in the embodiment of FIG. 2. It is possible to implement a further collection chamber in the lower part of the tool 1 for collecting debris, which is not supposed to enter the progressive cavity pump 30-1. A further flap valve may be needed to keep this debris in the lower collection chamber.

Figure 4:
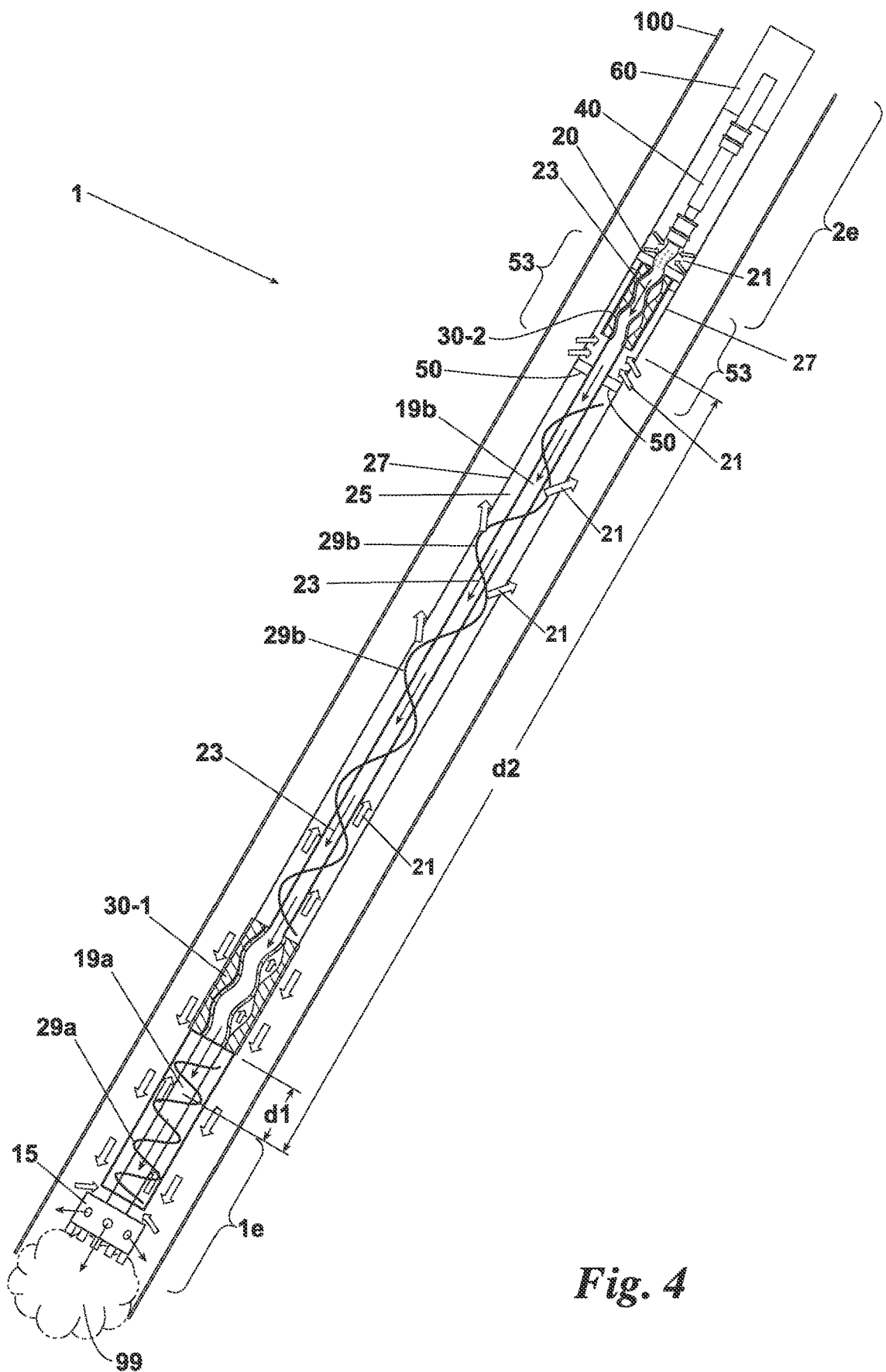
FIG. 4 shows a fourth embodiment of a wireline clean-out tool in accordance with the invention.

FIG. 4 shows a fourth embodiment of a wireline clean-out tool 1 in accordance with the invention. This embodiment will only be discussed in as far as it differs from the previous embodiments. A first major difference is that the wireline clean out tool 1 now comprises two progressive cavity pumps with a hollow rotor, a first one 30-1 provided at a first predefined distance d1 from the free-end portion 1e of the tool 1, and a second one 30-2 provided at a second predefined distance d2 further away from the free-end portion 1e of the tool 1. A second major difference is that the housing 20 comprises a porous wall 27, which has a double function in this embodiment.

The first function is the function of filter for the collection chamber 25. The first and lower progressive cavity pump 30-1 provides for the suction effect to take in the well fluid with debris at the free-end portion 1e of the tool 1 as illustrated by the hollow arrows. Once the well fluid has gone through the lower pump 1 it enters the collection chamber 25 and the fluid is pressed through the porous wall 27 into the wellbore 100, while the debris is kept in the collection chamber 25 by the porous wall 1.

The second function of the porous wall 27, or at least an upper part of this wall, is to form an inlet 53 for the second and upper progressive cavity pump 30-2. FIG. 4 illustrates the presence of an annular closure 50 separating the collection chamber 25 from the pump section and thereby forcing fluid to be taken into the upper progressive cavity pump 30-2 from the wellbore 100 through the porous wall 27, 53 as illustrated by the hollow arrows. The upper progressive cavity pump 30-2 provides for the jetting power at the free-end portion 1e. The advantage of this embodiment is that the respective progressive cavity pumps 30-1, 30-2 may be dimensioned differently, i.e. having a different pump capacity at a given rotation speed. By doing so the suction and jetting effect may be individually designed depending on the requirements.

The flow paths 21, 23 in the embodiment in FIG. 4 are a bit different from the previously described embodiments as the hollow arrows show. In fact the first flow path 21 runs partially outside the housing 20 of the tool 1, where the fluid escapes the collection chamber 25 and flows back into the inlet 53 for the second and upper pump 30-2 thereby bypassing the annular closure 50. In addition, some of the fluid escaping the collection chamber 25 will flow back to the free-end portion 1 e as the hollow arrows illustrate and may be sucked into the first opening 3 again.

It must be noted that the second and upper progressive cavity pump 30-2 is connected to the rotation motor 60 via a flex joint, because of the short distance between them. The chamber between the lower progressive cavity pump 30-1 and the well-cleaning device 1 may optionally be provided with a filter (not shown) to protect the pump 30-1.

Figure 5:
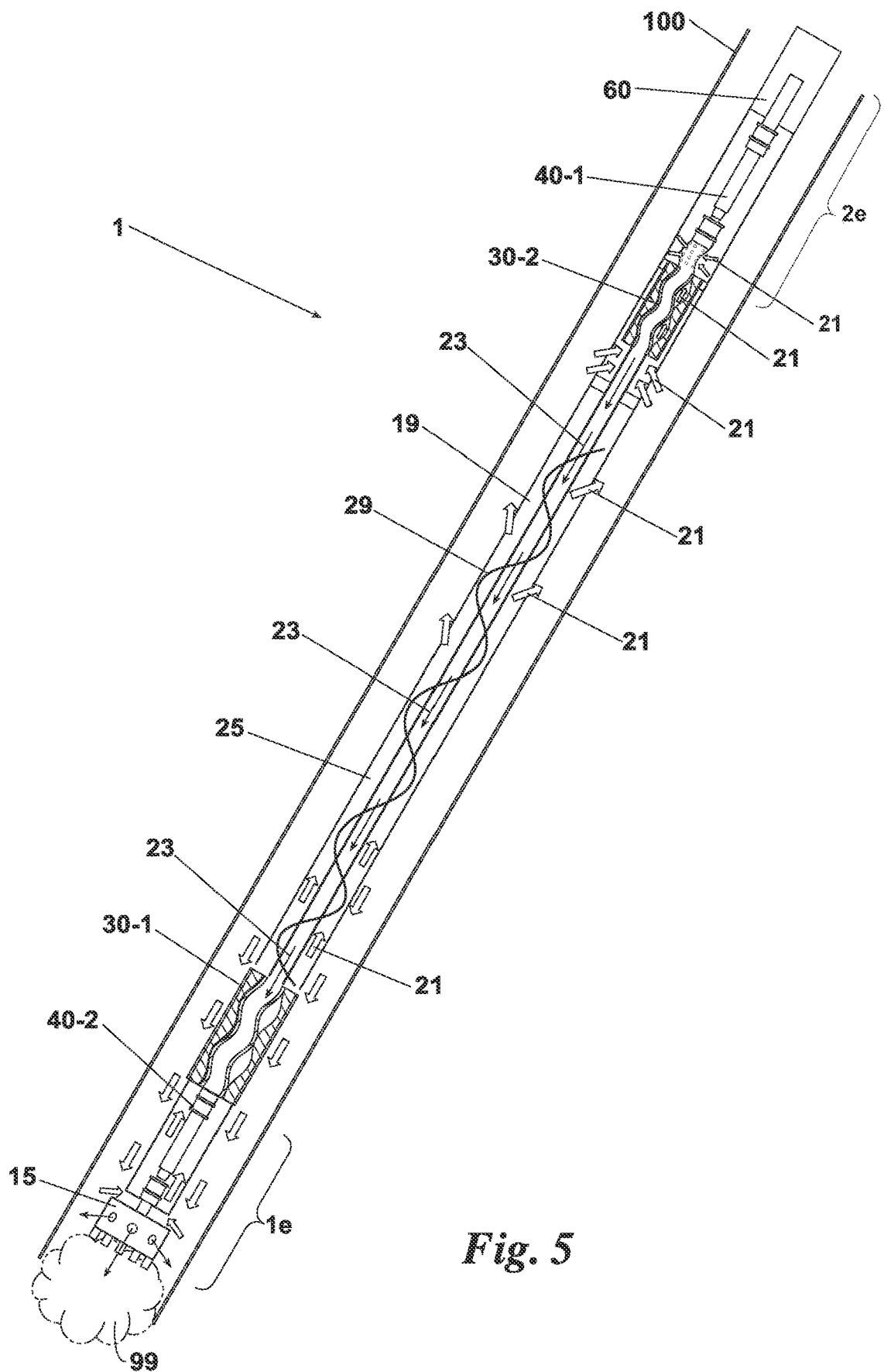
FIG. 5 shows a fifth embodiment of a wireline clean-out tool in accordance with the invention.

FIG. 5 shows a fifth embodiment of a wireline clean-out tool 1 in accordance with the invention. This embodiment will only be discussed in as far as it differs from the previous embodiment. A first major difference is the presence of two flex joints 40-1, 40-2 (Flex joint 40-2 is hollow). A first one 40-1 between the second and upper progressive cavity pump 30-2 and the rotation motor 60, and a second one 40-2 between the first and lower progressive cavity pump 30-1 and the well-cleaning device 15. As a consequence of the flex joints on both ends I e, 2e of the tool 1 there is now only one transport screw 29 shown in FIG. 5. But it must be noted that a transport screw (or transport blades) could also be implemented on a flex-joint.

Figure 6:
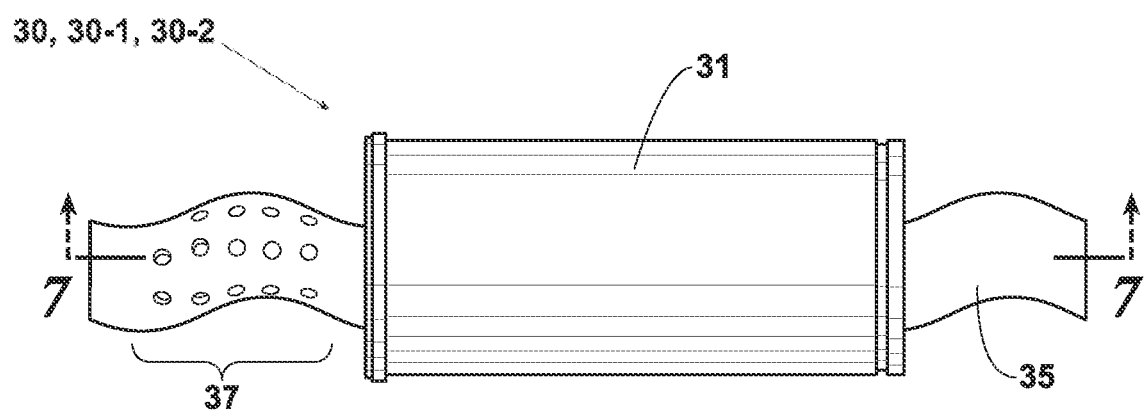
FIG. 6 shows a progressive cavity pump used in the wireline clean-out tool in accordance with the invention.
Figure 7:
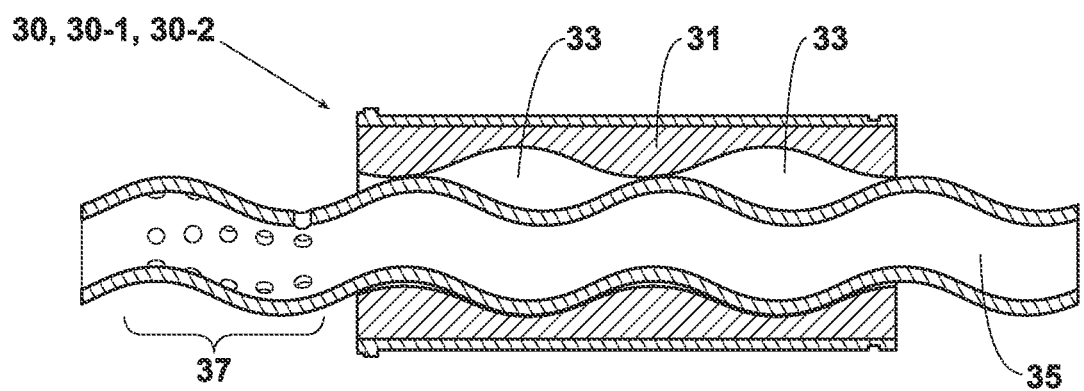
FIG. 7 shows a cross-sectional view of the progressive cavity pump of FIG. 6.

FIG. 6 shows a progressive cavity pump 30, 30-1, 30-2 used in the wireline clean-out tool 1 in accordance with the invention. FIG. 7 shows a cross-sectional view of the progressive cavity pump 30, 30-1, 30-2 of FIG. 6. Progressive cavity pumps as such are known units. However, the invention conveniently applies the progressive cavity pump 30, 30-1, 30-2 with a hollow rotor 35 as illustrated. The rotor 35 rotates in a stator housing 31 as illustrated and these two components are formed such that there are cavities 33, which by rotation move in an axial direction (reverse rotation will lead to the opposite movement). A further modification concerns the provision of holes 37 on one end of the pump 30, 30-1, 30-2 such that, when implemented in a clean-out tool 1 in accordance with the invention, said earlier-mentioned flow paths 21, 23 are coupled with each other.

Figure 8:
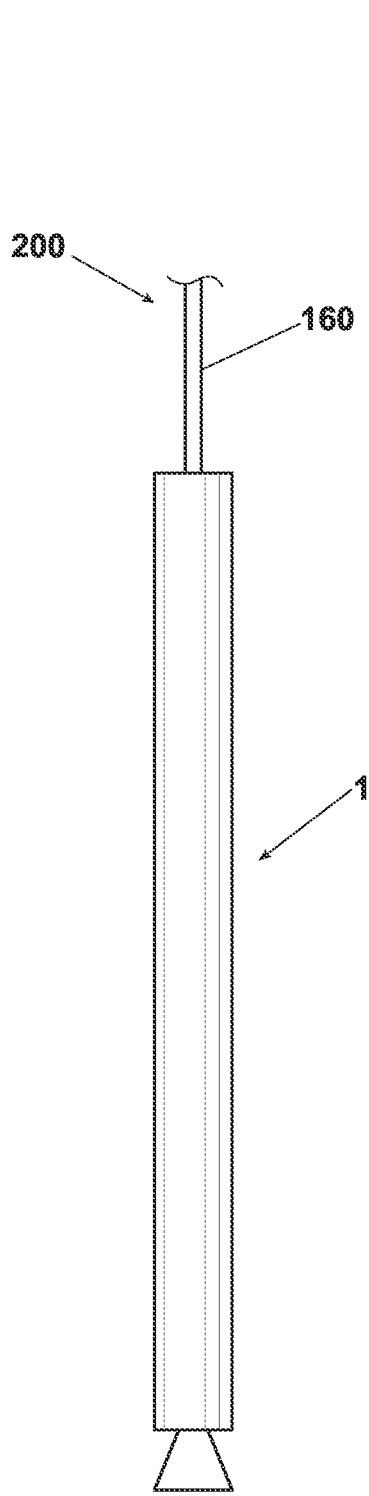
FIG. 8 shows a downhole tool string assembly in accordance with another embodiment of the invention.

FIG. 8 shows a downhole tool string assembly 200 in accordance with another embodiment of the invention. This assembly 200 forms one way in which the invention may be used, typically when the wellbores are vertical. It must be noted that FIG. 8 does not illustrate the rotation motor (to simplify the drawing), which typically may have a length of 2.5 meters and is generally not considered to be a part of the wireline clean-out tool itself, i.e. the rotation motor is in fact a separate tool in the tool string assembly.

Figure 9:
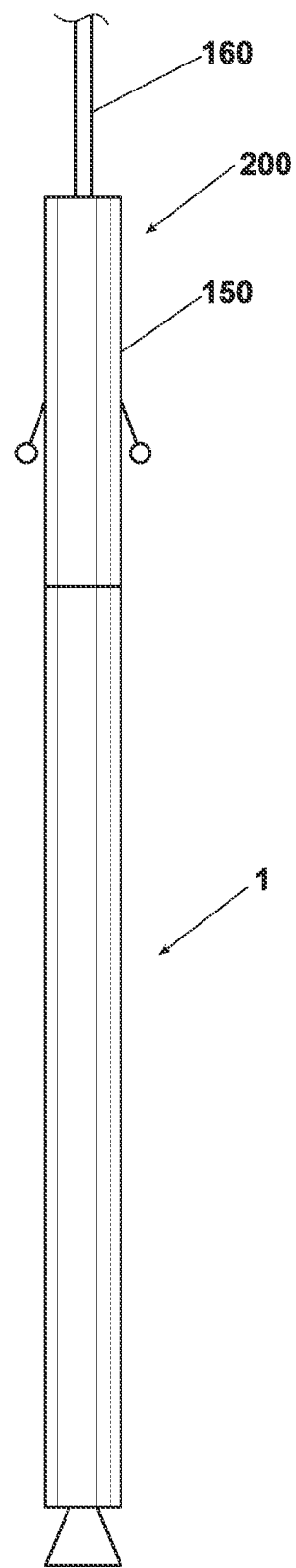
FIG. 9 shows a downhole tool string assembly with a wireline tractor in accordance with yet another embodiment of the invention.

FIG. 9 shows a downhole tool string assembly 200 with a wireline tractor 150 in accordance with yet another embodiment of the invention. This assembly 200 forms another way in which the invention may be used, typically when the wellbores are deviated or even horizontal. FIG. 9 does not illustrate the rotation motor either, which typically is located in between the wireline tractor 150 and the wireline clean-out tool 1.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A wireline clean-out tool for collecting debris in a wellbore, the wireline clean-out tool comprising:
    a first opening and a second opening being provided at or near a free-end portion of the wireline clean-out tool, wherein the first opening is for taking in said debris from the wellbore, and the second opening is for ejecting fluid into the wellbore;
    a housing defining a first flow path running from the first opening at the free-end portion to an opposite end portion of the housing, and a second flow path running from the opposite end portion to the second opening at the free-end portion, wherein said flow paths are coupled with each other at the opposite end portion;
a collection chamber provided in the first flow path for collecting said debris during operational use of the wireline clean-out tool, and
a progressive cavity pump having a hollow rotor, wherein the progressive cavity pump is placed inside the housing at a predefined distance from the free-end portion being configured for operating on the first flow path while the hollow rotor forms part of the second flow path.

2. The wireline clean-out tool according to claim 1, wherein the first flow path is annular and the second flow path is inside the first flow path.

3. The wireline clean-out tool according to claim 1, wherein the wireline clean-out tool comprises a further progressive cavity pump having a further hollow rotor, wherein the further progressive cavity pump is placed inside the housing at a further predefined distance from the free-end portion closer to the opposite end portion such that the further progressive cavity pump operates on the first flow path while the further hollow rotor forms part of the second flow path.

4. The wireline clean-out tool according to claim 3, wherein the housing comprises an inlet in a vicinity of the further progressive cavity pump for allowing well fluid to be sucked in from the wellbore at the further predefined distance further away from the free-end portion.

5. The wireline clean-out tool according to claim 4, wherein the inlet is formed by a porous wall of the housing.

6. The wireline clean-out tool according to claim 1, further comprising a well-cleaning device provided at a free-end portion of the wireline clean-out tool and being configured for loosening said debris in the wellbore.

7. The wireline clean-out tool according to claim 6, wherein the well-cleaning device comprises a rotatable member, wherein the wireline clean-out tool further comprises a rotatable shaft extending fully through the housing for actuating the rotatable member, wherein the rotatable shaft is hollow and defines the second flow path, and wherein a annular space between the rotatable shaft and the housing defines the first flow path.

8. The wireline clean-out tool according to claim 6, wherein the well-cleaning device further comprises a jetting device coupled to the second flow path for loosening debris in the wellbore by jetting.

9. The wireline clean-out tool according to claim 8, wherein the jetting device comprises a plurality of exhaust openings distributed around a circumference of the jetting device such that the jetting may be done in at least one of a plurality of radial directions simultaneously, and in axial directions.

10. The wireline clean-out tool according to claim 7, wherein the rotatable shaft comprises one or more transport blades at least over part of a length of the rotatable shaft for transporting the debris from the free-end portion to the collection chamber through rotation of the rotatable shaft.

11. The wireline clean-out tool according to claim 10, wherein a brush is provided on the transport blades, which touches a filter surface to effectively remove material from the filter surface to avoid filter cake formation.

12. The wireline clean-out tool according to claim 1, wherein the collection chamber comprises at least one filter for catching debris from the well fluid that is being transported through the first flow path.

13. The wireline clean-out tool according to claim 1, wherein the wireline clean-out tool is equipped with sensors and measurement devices to support a downhole cleaning operation.

14. Downhole tool string assembly comprising:
a wireline;
a wireline clean-out tool comprising:
    a first opening and a second opening being provided at or near a free-end portion of the wireline clean-out tool, wherein the first opening is for taking in said debris from the wellbore, and the second opening is for ejecting fluid into the wellbore;
    a housing defining a first flow path running from the first opening at the free-end portion to an opposite end portion of the housing, and a second flow path running from the opposite end portion to the second opening at the free-end portion, wherein said flow paths are coupled with each other at the opposite end portion;
    a collection chamber provided in the first flow path for collecting said debris during operational use of the wireline clean-out tool,
    a progressive cavity pump having a hollow rotor, wherein the progressive cavity pump is placed inside the housing at a predefined distance from the free-end portion configured for operating on the first flow path while the hollow rotor forms part of the second flow path; and
the wireline clean-out tool being connected to the wireline.

15. The downhole tool string assembly according to claim 14, further comprising a wireline tractor coupled between the wireline and the wireline clean-out tool.

16. The wireline clean-out tool according to claim 6, wherein the rotatable member is selected from the group consisting of a drill bit, honing head and a brush.

17. The wireline clean-out tool according to claim 9, wherein the plurality of exhaust openings are jetting nozzles.

* * * * *